US007236795B2

(12) United States Patent
Samuel

(10) Patent No.: US 7,236,795 B2
(45) Date of Patent: Jun. 26, 2007

(54) CONTROLLING PROCESSOR LOAD IN A WIRELESS TELECOMMUNICATIONS NETWORK NODE

(75) Inventor: Issac Samuel, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 194 days.

(21) Appl. No.: 10/787,527

(22) Filed: Feb. 26, 2004

(65) Prior Publication Data
US 2005/0192001 A1 Sep. 1, 2005

(51) Int. Cl.
H04M 1/00 (2006.01)

(52) U.S. Cl. .................. 455/453; 455/453; 455/67.11; 455/67.12

(58) Field of Classification Search ................ 379/133, 379/134, 101–135; 455/450, 452.1, 452.2, 455/67.11, 423, 453, 67.12; 370/230–235
See application file for complete search history.

(56) References Cited
U.S. PATENT DOCUMENTS

| | | | |
|---|---|---|---|
| H1895 H * | 10/2000 | Hoffpauir et al. ........... 455/433 |
| 6,129,604 A * | 10/2000 | Maveddat et al. .......... 455/453 |
| 6,718,170 B1 * | 4/2004 | Hughes ....................... 455/450 |
| 6,832,086 B1 * | 12/2004 | Powers et al. .............. 455/423 |
| 6,920,112 B1 * | 7/2005 | McCloghrie et al. ....... 370/252 |
| 2001/0012778 A1 * | 8/2001 | Eriksson et al. ............ 455/436 |
| 2002/0052206 A1 * | 5/2002 | Longoni ..................... 455/453 |
| 2002/0082036 A1 * | 6/2002 | Ida et al. .................... 455/522 |
| 2002/0160811 A1 * | 10/2002 | Jannette et al. ............ 455/560 |
| 2003/0114159 A1 * | 6/2003 | Park et al. .................. 455/436 |
| 2003/0156584 A1 * | 8/2003 | Bergenlid et al. .......... 370/389 |
| 2004/0030776 A1 * | 2/2004 | Cantrell et al. ............. 709/224 |
| 2004/0052228 A1 * | 3/2004 | Tellado et al. .............. 370/334 |
| 2004/0209623 A1 * | 10/2004 | Sauter et al. ............... 455/453 |
| 2005/0124369 A1 * | 6/2005 | Attar et al. ................. 455/522 |

* cited by examiner

Primary Examiner—Nick Corsaro
Assistant Examiner—Fred Casca

(57) ABSTRACT

A wireless telecommunications network node is provided. The node includes a processor configured to handle call traffic and to record measurement data. The processor is also configured to detect processor load and to automatically adjust the rate of recordal of measurements dependent on detected processor load. The adjustments are so as to keep the processor load within predetermined limits.

15 Claims, 2 Drawing Sheets

CONTROLLING PROCESSOR LOAD IN A WIRELESS TELECOMMUNICATIONS NETWORK NODE

FIELD OF THE INVENTION

The present invention lies in the field of wireless telecommunications. The present inventions relates to a wireless telecommunications network node, to a wireless telecommunications network, and to a method of controlling processor load in wireless telecommunications network node.

DESCRIPTION OF THE RELATED ART

Call events, such as denials of call access, drops, handovers, and blocked calls are recorded in wireless telecommunications networks, such as a Universal Mobile Telecommunications System (UMTS) network. A denial of call access can occur where received signal strength is unacceptable, possibly due to signal fading. A call is blocked where the network is too busy to handle that call.

A record of an event is made by a network element, such as a base station controller, shortly after the event occurs. A base station controller in a UMTS network is known as a Radio Network Controller (RNC). A record of an event is naturally known as an event record. The event records are analysed to provide statistics of the numbers of various types of call events occurring in a specified time. Also, the event records are reported to an operations and maintenance centre (OMC) at every 15 minutes or other specified interval. Much memory and processing resources are used by the network element in making the event records and processing them to provide statistics.

In known systems, an operator at the OMC enables and schedule the times at which specific types of statistics will be collected by the network element such as an RNC. However, the maximum number of types of statistics that can safely be collected is very limited. A limit is given for the network element based upon expected processor load with various types of statistics activated. Collecting additional statistics beyond this often results in the network element becoming overloaded. The network element will then need to reboot causing a disruption in service. This is a problem, particularly when it would otherwise be desirable to collect such additional statistics; for example, for diagnostic purposes when the network is not performing well.

Particularly when a fault event has occurred, it is useful to investigate radio conditions experienced by specific mobiles. Each mobile that experience a less than acceptable signal to noise ratio makes measurements of the radio conditions that it experiences. These are known as Radio Frequency (RF) measurements. The RF measurement values are sent via base stations to the radio network controller (RNC). The operator at the operations and maintenance centre (OMC) can enable recordal by the RNC of RF measurements for only a small number of the mobiles that are in connection with base stations under the control of an RNC. This number is typically only two or three mobiles per RNC. If this number is exceeded the amount of measurements recorded will be more than that network element can handle. The chance of the RNC needing to reboot due to excessive load then becomes very high.

The number of measurements, such as event records or RF measurements, that can be recorded per unit time varies. This is because the number of calls for the processor in the RNC to handle varies over time. Accordingly, the operator checks from time to time the level of traffic in the network and estimates when to enable the recording of measurements and for how long. During the hours of peak traffic, the load due to call processing is quite high. This means during expected busy periods the processing load due to measurement recording, analysis and reporting should not be increased. At other times, the load due to call processing can be expected to be less so additional measurements can then be recorded for analysis and reporting.

Accordingly, we can say that such systems are known to have problems in selecting how many measurements to record.

SUMMARY OF THE INVENTION

The inventor(s) found a way to control the number of measurements recorded by a network node such as a radio network controller (RNC) by the node monitoring the load on its processor and automatically adjusting the rate of measurement recordal to keep the processor load high but within acceptable limits.

An example of the present invention is a wireless telecommunications network node. The node includes a processor configured to handle call traffic and to record measurement data. The processor is also configured to detect processor load and to automatically adjust the rate of recordal of measurements dependent on detected processor load. The adjustments are so as to keep the processor load within predetermined limits.

BRIEF DESCRIPTION OF THE DRAWINGS

An illustrative embodiment of the present invention will now be described by way of example and with reference to the drawings, in which.

DETAILED DESCRIPTION

When considering a known system, the inventor realized that a method could be provided to adjust the level of measurements recordals automatically dependent on the processor loading. The processor loading includes that due to call processing. In consequence, the processor in a network element such as the radio network controller (RNC) is kept well occupied even though the level of call processing varies. There is no need for the operator to make an intervention to adjust the level of measurement recordals made. The network would be self-correcting in the rate of recordal of measurements.

Without operator intervention, in an adaptive process, the maximum number of records of measurements is automatically made, whilst the processor handles all current call traffic and the total processor load is kept to an acceptable level. The operator does not need to manually adjust the measurement recordal rate.

Furthermore, in analyzing the event records, the most important statistics are always collected and reported while less useful statistics are sacrificed when necessary to reduce total processor load. The operator does not need to manually activate or deactivate collection of various types of statistics.

Having a good number of records to process, and analyze to provide statistics, means that the network can be upgraded readily.

Example Network

Figure 1:
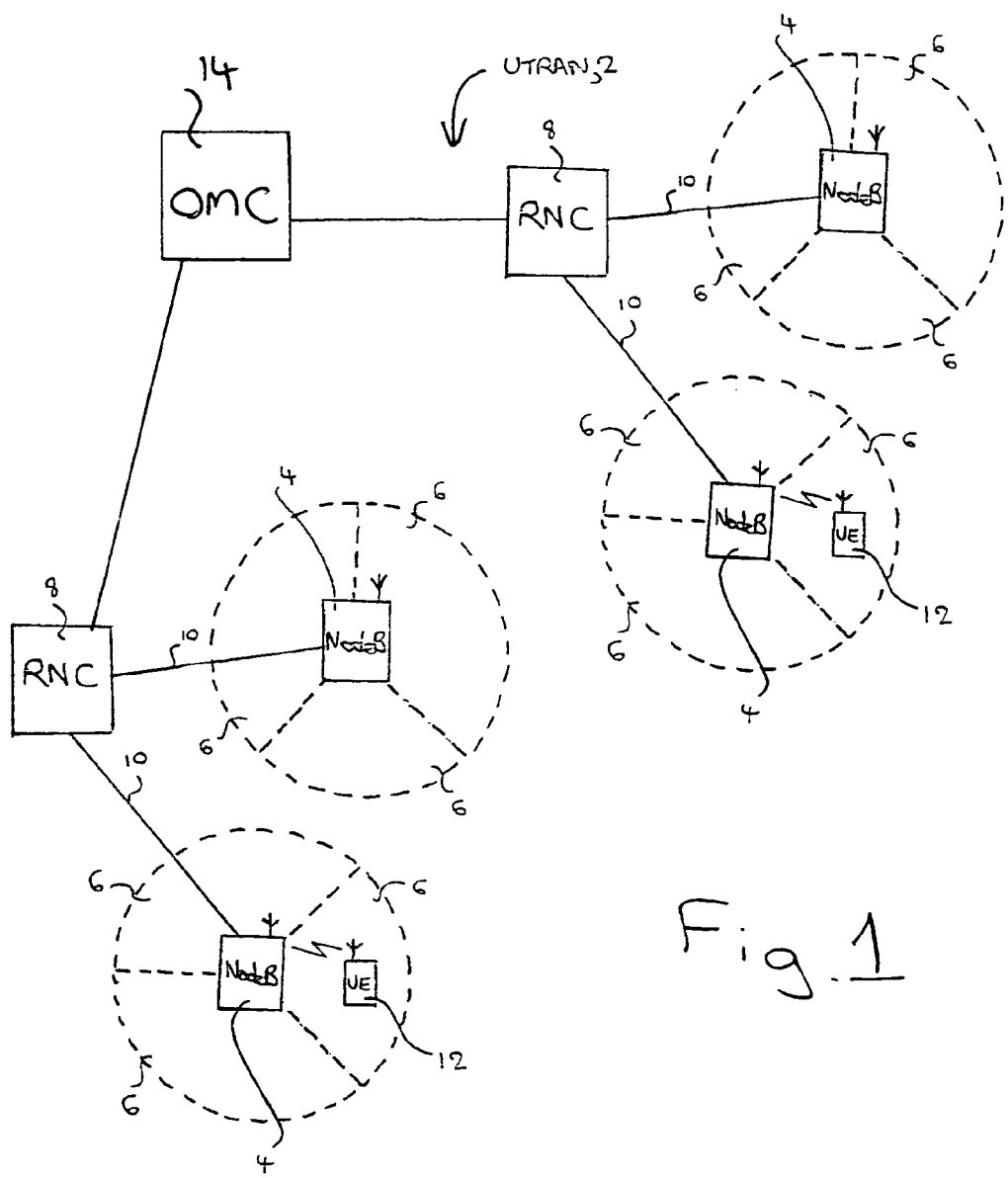
FIG. 1 is a diagram illustrating a Universal Mobile Telecommunications System (UMTS) wireless telecommunications network.

The network is a Universal Mobile Telecommunications System (UMTS) terrestrial access network (UTRAN), which is a type of wideband code division multiple access (CDMA) network for mobile telecommunications. The UTRAN network is basically as shown in FIG. 1. Only two radio network controllers and four base stations of the UTRAN network 2 are shown for simplicity. As shown in this Figure, the UTRAN network 2 includes base stations 4. In the Figure, each of the base stations 4 is also designated "Node B" in accordance with UMTS terminology. Each base station typically has three cells 6, each covered by one of three directional antennas (not shown) angled at 120 degrees to each other in azimuth. A cell, also referred to as a sector, is a radio-coverage area. Each radio network controller (RNC) 8 typically controls several base stations 4 and hence a number of cells 6. A base station 4 is connected to its controlling radio network controller (RNC) 8 via a respective interface 10 known as an IuB interface. In use, a mobile user terminal 12 (often referred to as User Equipment (UE) in UMTS terminology) communicates with a serving radio network controller (RNC) 8 via at least one cell 6 of at least one base station 4. In that way, the mobile user terminal communicates with the UTRAN network 2.

The radio network controllers (RNC) 8 are connected to a remote operations and maintenance centre (OMC) 14.

Event Records

The inventors contemplated event records which include not only details of a call event, such as a fault, and associated radio conditions experienced by a mobile user terminal, but also the geographical coordinates of the mobile user terminal. Constructing and handling the event records requires a large amount of processing resource. One reason is because the radio condition details and geographic measurements are determined by the radio network controller (RNC) every second. Also the event records are constructed and stored at the RNC, and reported from there to the operations and maintenance centre (OMC).

More specifically, the geographic location within the cell of the mobile user terminal experiencing the fault is included in an event record. The location of the fault event is given to within a few meters. The event record also includes an indication of the type of fault and radio signal transmission measurements.

In so-called third generation wireless networks, such as the Universal Mobile Telecommunications System (UMTS) network which is described, location of the mobile user terminal is known automatically by the network so as to enable location based services to be provided. The location of the mobile user terminal is determined by the network, specifically by the RNC, in response to requests made to the mobile user terminal that has requested a location-based service. The mobile user terminal provides enough information to the network, for example as to received signal strengths from various base stations, to enable the network to calculate the position of the mobile user terminal.

Alternatively, in another embodiment (not shown) otherwise similar to the first embodiment, mobile user terminals have Global Positioning System (GPS) receivers built-in which directly supply the geographic coordinates of the mobile user terminal to the network.

If an event occurs, the RNC controlling a base station handling the mobile user terminal in question stores in an event record the location of the mobile user terminal experiencing the fault together with an indication of the type of fault and radio signal transmission measurements received from the base station (NodeB). The events are usually fault events, such as call drop, call setup failure, handover failure etc. Each record includes a timestamp. Table 1 below is an example event record.

TABLE 1

| Record #587 Timestamp 15:35:27 UE Id | Cell-id | BLER Uplink dB | BLER Down link dB | Ec/Io | CPICH RSCP | Cause value | X Coord | Y Coord |
|---|---|---|---|---|---|---|---|---|
| Source | Cell A | −0.13 | −0.78 | −5 dB | −75 dbm | Abnormal call termination | 1.00076 | 59.678 |
| Active set | Cell B | −5.1 | −5.12 | −4 dB | −72 dbm | | 53.7071 | 23.2855 |
| Active set | Cell C | −4.33 | −4.75 | −7 dB | −80 dbm | | 52.9669 | 24.0126 |
| Monitored set | Cell D | | | −9 dB | −85 dbm | | 52.7457 | 23.8804 |

As shown in Table 1, information is included in the event record from the cell to which the mobile experiencing the fault is located ("source cell"), from the cells in the active set of cells for handover(handoff) thereto, and from the set of cells ("monitored set") monitored for prospective inclusion into the active set. Radio signal transmission information between the base station and mobile user terminal for which the fault occurred is also recorded along with a "cause value" indicating the type of fault.

More specifically, as shown in Table 1, the event record includes a timestamp, identity ("cell-id") of the source cell, the identity of cells in the active set, and can include the identity of one or more cells from the monitored set. For at least the source cell and cells of the active set (but possibly also one or more cells of the monitored set), X-Y location coordinates are included together with radio signal transmission data. The radio signal transmission data is: block error rate (BLER) in the uplink direction (that is from mobile user terminal to base station), block error rate (BLER) in the downlink direction (that is from base station to mobile user terminal), the ratio (denoted Ec/Io) of signal energy (chip energy) to energy of interference from other cells, common pilot channel received signal code power (CPICH RSCP), and the "cause value" which is one of a number of standard descriptors regarding the type of the fault.

The event records are stored in the radio network controller (RNC) 8. The event records are forwarded to the operations and maintenance centre (OMC) 14.

Processor Load Due to Constructing and Handling Event Records

Each mobile user terminal that experiences an event, such as a fault or less than acceptable signal to noise, sends a measurement report to its base station. In this regards, the base station can be considered transparent in that the base station forwards to the RNC all measurement reports that it receives.

It is not possible to store each measurement report at the RNC for forwarding to the OMC, due to the processing load needed to maintain call traffic. Hence only a proportion of the measurements reports are converted by the RNC into event records which are stored and reported up to the OMC. This proportion is variable. This proportion could vary around 5%, for example.

When the processor load is high due to high call volume, the event record recordal rate at the RNC should be lower to reduce the number of measurement records processed. When the call volume reduces, the event record recordal rate at the RNC should be higher to enable more data about the performance of the network to be collected. The process is "dynamic", being adaptive over time. The recordal rate at the RNC is automatically adjusted by feedback of the level of processor load so as to automatically increase or decrease the rate of recordal of measurements, as explained below with reference to FIG. 2.

Figure 2:
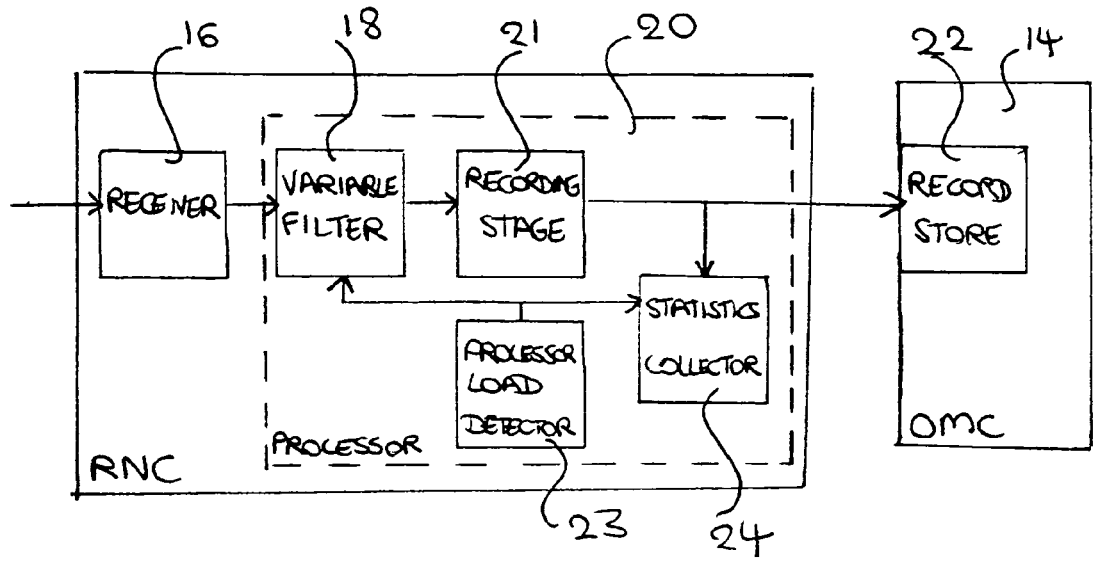
FIG. 2 is a diagram illustrating an radio network controller (RNC) and an operations and maintenance centre (OMC) of the network shown in FIG. 1.

As shown in FIG. 2, an RNC 8 consists of receiving circuitry 16 connected to a processor 20. The processor 20 mainly handles call traffic. Additionally the processor 20 handles measurement reports. Measurements regarding events including the Radio Frequency (RF) measurement data are received by the receiving circuitry 16 from all the mobiles experiencing an event. An event can be a fault such as unacceptable noise being experienced in a cell of a base station controlled by the RNC.

The processor 20 includes a variable filter 18, a measurement recording stage 21, and a processor load detector 23 The variable filter 18 receives the measurement reports. Depending on the loading of the processor 20 as determined by the processor load detector 23, the measurement reports are filtered in the sense that a large proportion of the measurement reports are discarded, typically 95%. The rest of the measurements are allowed to be processed by the recording stage 21. This processing involves recording the measurements into event records as explained in the previous section. This processing also involves forwarding the event records to the operations and maintenance centre (OMC) 14. The event records are stored in a record store 22 in the OMC 14.

The proportion of measurements recorded by the recording stage 21 has a big effect on overall current load on the processor 20. A feedback mechanism is used to keep the proportion of measurements recorded and forwarded by the processor 20 as high as possible, but without preventing a mobile user terminal making or receiving a call. Specifically, feedback information of the level of loading of processor 20 is fed back from the processor load detector 23 to variable filter 18. The variable filter 18 automatically adjusts the proportion of incoming measurement reports that are passed to the recording stage 21 in consequence.

Figure 3:
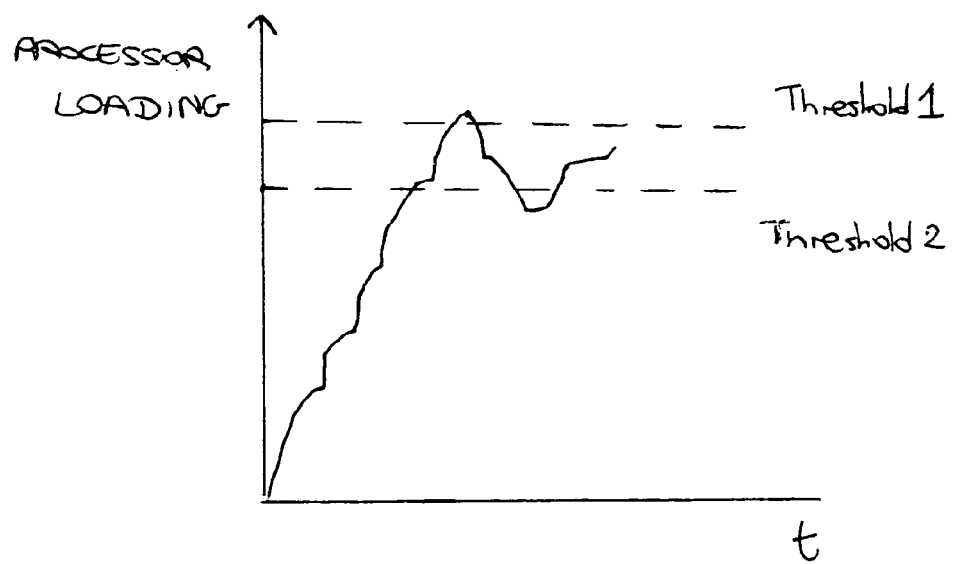
FIG. 3 is a diagram illustrating adjustment of the measurement recordal rate dependent upon processor load.

The feedback mechanism is illustrated in FIG. 3. As shown in FIG. 3, initially when process starts, the recordal rate is at a minimum value of zero, and so a minimum processor load is observed which is below Threshold 1. Threshold 1 corresponds to the highest desirable processor load. Hence the measurement recordal rate is increased incrementally in steps of 2% and for each step the total processor load is monitored. When the total processor load increases beyond Threshold 1, the recordal rate is reduced in steps of 2%. The recordal rate is decreased until the sample rate reaches Threshold 2. Threshold 2 corresponds to the lowest desirable processor load. Then once again, the recordal rate is increased in steps of 2%. The objective of the feedback process is to keep the total processor load between the two thresholds. In this way the total processor load is kept acceptably high, with as many event records as reasonably possible being made when process load due to call traffic permits.

Collecting Statistics

In the radio network controller (RNC), statistics are collected of the number of call attempts, number of successful calls, number of call drops within a cell over a predetermined time. These are usually used to determine so-called Key Performance indicators (KPIs) such as Call drop rate, Established Call success rate, Call blocking rate, and Total Traffic rate. The statistics are collected by analyzing the event records made.

As shown in FIG. 2, the event records provided by the processor 20 and the information as to the loading on processor 20 provided by processor load detector 23 are input to a statistics collector 24. The collection of particular types of statistics by the statistics collector are activated or deactivated selectively using feedback of the processor load level. Which statistics are recorded depends not only on the processor load level detected by the processor load detector 23, but also on a ranking of the statistics which can be collected in order of importance.

For example, a statistic can be categorized in Class 1, Class 2, or Class 3, according to importance.

Accordingly, when the processor load is above Threshold 1 shown in FIG. 3, the types of statistics of least importance, e.g. those in Class 3, are deactivated one by one based on their importance within the class. If even deactivating all of these is insufficient to reduce processor load to an acceptable level, then the Class 2 types of statistics are deactivated one by one in a similar fashion, and so on, until an acceptable processor load level is reached. When the total processor load goes below Threshold 2 shown in FIG. 3, the collection of statistics that were deactivated are again activated in order of importance until the processor load reaches Threshold 1, starting with the one of the highest importance among those deactivated. This is, of course, an automatic process.

OTHER EMBODIMENTS

Some other embodiments lie outside the field of Universal Mobile Telecommunications System (UMTS) networks, for example in other time division multiple access and code division multiple access (CDMA) networks, for example in Global System for Mobiles (GSM) and CDMA2000.

Some advantageous embodiments relate to the control of processor load in other network nodes than radio network controllers/base station controllers; for example in base stations where the base station itself is configured to filter the measurements forwarded on to higher level node such as a base station controller.

Measurement data recorded can be of indications of events experienced by mobile user terminals and measurements of radio conditions experienced by mobile user terminals, for example in event records. The measurement data can include data of the geographical location of the respective mobile user terminal. Other possibilities include that the measurement data comprises indications of events experienced by mobile user terminals and/or measurements of radio conditions experienced by mobile user terminals and/or data of geographical location of the mobile user terminal.

The invention claimed is:

1. A wireless telecommunications network node comprising a processor configured to handle call traffic and to record measurement data, the processor being configured to detect processor load and to automatically adjust the rate of recordal of measurements dependent on detected processor load so as to keep the processor load within predetermined limits, and the measurement records being event records that include call events, and in which the processor load is allowed to increase to beyond a first threshold whereupon the rate of recordal of measurements is reduced in successive steps until the processor load falls below a second threshold whereupon the rate of recordal of measurements is increased in successive steps, the first threshold being higher than the second threshold.

2. A wireless telecommunications network node according to claim 1, the processor comprising a processor load detector and a variable filter, the filter acting to discard a proportion of measurement reports received, the proportion being adjusted dependent upon the processor load.

3. A wireless telecommunications network node according to claim 1 in which on start up the processor load is allowed to increase to beyond a first threshold.

4. A wireless telecommunications network node according to claim 1, in which the processor comprises a statistics collector, the statistics collector acting to selectively adjust dependent on detected processor load which of a variety of possible statistics are collected, the statistics being collected from analysis of the measurement records.

5. A wireless telecommunications network node according to claim 4, in which the number of statistics collected is increased upon the processor going below a first threshold and the number of statistics collected is reduced upon the processor load going above a second threshold, the second threshold being higher than the first threshold.

6. A wireless telecommunications network node according to claim 1, in which the measurement records are event records each comprising an indication of a call event experienced by a mobile user terminal and measurements of radio conditions experienced by the mobile user terminal.

7. A wireless telecommunications network node according to claim 6, in which the measurement records also comprise data of geographical location the mobile user terminal.

8. A wireless telecommunications network node according to claim 1, comprising an outlet port for transfer of measurement records to a remote network node.

9. A wireless telecommunications network node according to claim 1, which is a controller configured to control at least one base station for wireless telecommunications to mobile user terminals 10. A wireless telecommunications network node according to claim 9, which is a radio network controller.

11. A wireless telecommunications network node according to claim 9, which is a radio network controller of a Universal Mobile Telecommunications System (UMTS) wireless telecommunications network.

12. A wireless telecommunications network comprising an operations and maintenance centre, a radio network controller, and a plurality of base stations under the control of the radio network controller and configured for wireless telecommunications with mobile user terminals, the radio network controller comprising a processor configured to handle call traffic and to record measurement data, the processor being configured to detect processor load and to automatically adjust the rate of recordal of measurements dependent on detected processor load so as to keep the processor load within predetermined limits, and the measurement records being event records that include call events, and in which the processor load is allowed to increase to beyond a first threshold whereupon the rate of recordal of measurements is reduced in successive steps until the processor load falls below a second threshold whereupon the rate of recordal of measurements is increased in successive steps, the first threshold being higher than the second threshold.

13. A method of controlling processor load in wireless telecommunications network node comprising a processor, the processor handling call traffic and recording the measurement data, the processor detecting processor load and automatically adjusting the rate of recordal of measurement data dependent on detected processor load so as to keep the processor load within predetermined limits, and the measurement records being event records that include call events, and in which the processor load is allowed to increase to beyond a first threshold whereupon the rate of recordal of measurements is reduced in successive steps until the processor load falls below a second threshold whereupon the rate of recordal of measurements is increased in successive steps, the first threshold being higher than the second threshold.

14. A wireless telecommunications network node comprising a processor configured to handle call traffic and to record measurement data, the processor being configured to detect processor load and to automatically adjust the rate of recordal of measurements dependent on detected processor load so as to keep the processor load within predetermined limits and the measurement records being event records that include call events; and in which the processor comprises a statistics collector, the statistics controller acting to selectively adjust dependent on detected processor load which of a variety of possible statistics are collected, the statistics being collected from analysis of the measurement records.

15. A method of controlling processor load in wireless telecommunications network node comprising a processor, the processor handling call traffic and recording the measurement data, the processor detecting processor load and automatically adjusting the rate of recordal of measurement data dependent on detected processor load so as to keep the processor load within predetermined limits, and the measurement records being event records that include call events; and in which the processor comprises a statistics collector, the statistics controller acting to selectively adjust dependent on detected processor load which of a variety of possible statistics are collected, the statistics being collected from analysis of the measurement records.

* * * * *